(12) United States Patent
Kajihara

(10) Patent No.: US 7,864,375 B2
(45) Date of Patent: Jan. 4, 2011

(54) PRINT-IMAGE FORMING APPARATUS, PRINT-IMAGE FORMING METHOD, AND PROGRAM

(75) Inventor: Mikihiro Kajihara, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 1253 days.

(21) Appl. No.: 11/444,623

(22) Filed: May 31, 2006

(65) Prior Publication Data

US 2007/0013950 A1 Jan. 18, 2007

(30) Foreign Application Priority Data

Jul. 15, 2005 (JP) .............................. 2005-207521

(51) Int. Cl.
*H04N 1/00* (2006.01)
*H04N 1/40* (2006.01)

(52) U.S. Cl. ................................. 358/3.28; 358/426.06

(58) Field of Classification Search ................. 358/1.2, 358/1.6, 1.9, 1.18, 451, 449, 3.26, 437, 2.1, 358/3.03, 3.23, 3.28, 2.31, 537, 539, 426.03, 358/426.11, 443, 470, 426.06; 235/435, 235/436, 454, 470, 483, 437, 494; 382/298, 382/312, 317; 345/667, 668, 669
See application file for complete search history.

(56) References Cited

U.S. PATENT DOCUMENTS

| | | | | |
|---|---|---|---|---|
| 5,559,318 A | * | 9/1996 | Aoki | 235/454 |
| 5,761,219 A | * | 6/1998 | Maltsev | 714/752 |
| 5,997,129 A | * | 12/1999 | Matsuhashi | 347/35 |
| 6,014,501 A | * | 1/2000 | Fukuda et al. | 358/3.09 |
| 6,126,074 A | * | 10/2000 | He et al. | 235/454 |
| 6,331,901 B1 | * | 12/2001 | Fukuda et al. | 358/1.2 |
| 6,681,055 B1 | * | 1/2004 | Sato | 382/275 |
| 6,906,812 B2 | | 6/2005 | Koakutsu et al. | |
| 6,977,749 B2 | * | 12/2005 | Currans et al. | 358/1.18 |
| 6,983,886 B2 | * | 1/2006 | Natsukari et al. | 235/462.1 |
| 7,048,191 B2 | * | 5/2006 | Park et al. | 235/462.01 |
| 7,116,826 B2 | * | 10/2006 | Umeda et al. | 382/232 |
| 7,240,841 B2 | * | 7/2007 | Kelley et al. | 235/462.01 |
| 7,299,972 B2 | * | 11/2007 | Kelley et al. | 235/375 |
| 7,523,864 B2 | * | 4/2009 | Manheim | 235/462.01 |

(Continued)

FOREIGN PATENT DOCUMENTS

JP 2000076372 A 3/2000

(Continued)

*Primary Examiner*—Jerome Grant, II
(74) *Attorney, Agent, or Firm*—DLA Piper LLP (US)

(57) ABSTRACT

A print-image forming apparatus which forms a print image for printing on a print sheet a two-dimensional code whose size is defined based on an error correction rate, the apparatus including: a storage device which stores a plurality of levels of error correction rates; a setting device which sets an arbitrary error correction rate from among the plurality of error correction rates; an image forming device which forms the print image based on the error correction rate thus set; a determining device which determines whether or not the formed print image lies off a code printing area of the print sheet where the two-dimensional code is printed; and a setting changing device which changes the setting of the error correction rate such that the print image can lie in the code printing area when it is determined that the print image lies off the code printing area.

11 Claims, 9 Drawing Sheets

U.S. PATENT DOCUMENTS

| | | | |
|---|---|---|---|
| RE40,775 E * | 6/2009 | Arquilevich et al. | 358/1.8 |
| 2001/0035971 A1 * | 11/2001 | Koakutsu et al. | 358/1.13 |
| 2005/0077361 A1 * | 4/2005 | Sakai et al. | 235/487 |
| 2005/0224571 A1 * | 10/2005 | Kelley et al. | 235/375 |
| 2007/0195337 A1 * | 8/2007 | Takayama et al. | 358/1.2 |
| 2008/0074697 A1 * | 3/2008 | Sawada et al. | 358/1.15 |

FOREIGN PATENT DOCUMENTS

| | | | |
|---|---|---|---|
| JP | 2001-293909 | | 10/2001 |
| JP | 2002264424 | A | 9/2002 |
| JP | 2004328496 | A | 11/2004 |
| JP | 2005-074725 | | 3/2005 |
| JP | 2005164655 | A | 6/2005 |
| JP | 2007090741 | A * | 4/2007 |

* cited by examiner

PRINT-IMAGE FORMING APPARATUS, PRINT-IMAGE FORMING METHOD, AND PROGRAM

The entire disclosure of Japanese Patent Application No. 2005-207521, filed Jul. 15, 2005, is expressly incorporated by reference herein.

BACKGROUND

1. Technical Field

The present invention relates to a print-image forming apparatus, a print-image forming method, and a program, which form a print image for printing a two-dimensional code on a print sheet.

2. Related Art

A known print-image forming apparatus (host apparatus) is of a type which is connected to a printer and forms a print image for printing a two-dimensional code on a print sheet. Prior to a printing process, the apparatus determines whether or not a print image lies off a code printing area where the print image is printed. When the print image is determined to lie off the code printing area, it is likely to reduce a whole print image in size by making a cell (module), the minimum unit of codeword constituting a two-dimensional code, smaller so that the print image can lie in the code printing area. Reference is made to JP-A-2001-293909 (paragraph [0058] or the like) as an example of related art.

However, the reduction of the cell size causes deterioration in quality of print image and reading accuracy. Therefore, the reduction of the whole print image in size by making the cell smaller is not practical and causes problems.

SUMMARY

It is an advantage of the invention to provide a print-image forming apparatus, a print-image forming method, and a program, capable of reducing the print image of a two-dimensional code in size so as to lie in a code printing area without making the size of a plurality of cells constituting the two-dimensional code smaller.

According to one aspect of the invention, there is provided a print-image forming apparatus which forms a print image for printing on a print sheet a two-dimensional code whose size is defined based on an error correction rate. The apparatus comprises: a storage device which stores a plurality of levels of error correction rates; a setting device which sets an arbitrary error correction rate from among the plurality of error correction rates; an image forming device which forms the print image based on the error correction rate thus set; a determining device which determines whether or not the formed print image lies off a code printing area of the print sheet where the two-dimensional code is printed; and a setting changing device which changes the setting of the error correction rate such that the print image can lie in the code printing area when it is determined that the print image lies off the code printing area.

According to another aspect of the invention, there is provided a print-image forming method for forming a print image for printing on a print sheet a two-dimensional code whose size is defined based on an error correction rate. The method comprises: setting an arbitrary error correction rate from among a plurality of levels of error correction rates stored in advance; forming the print image based on the error correction rate thus set; determining whether or not the formed print image lies off a code printing area of the print sheet where the print image is printed; and changing the setting of the error correction rate such that the print image can lie in the code printing area when it is determined that the print image lies off the code printing area.

According to these configurations, a low error correction rate is set such that a print image can lie in the code printing area, and the print image is formed based on the error correction rate after the setting change is performed. As a result, the print image can lie in the code printing area. It is thus possible to reduce the print image of the two-dimensional code in size so as to lie in the code printing area by lowering the error correction rate without making the size of the plurality of cells constituting the two-dimensional code smaller. Accordingly, it is possible to form good print images of the two-dimensional code without deterioration in quality of the print image and reading accuracy.

According to the print-image forming apparatus, it is preferable that the setting changing device change the error correction rate for the maximum one from among the error correction rates at which the print image can lie in the code printing area.

According to this configuration, if there are a plurality of error correction rates at which a print image can lie in the code printing area, the maximum error correction rate can be set. Therefore, it is possible to provide the two-dimensional code to be printed with as high an error correction function as possible.

In these cases, it is preferable that the print-image forming apparatus further comprise a setting-change determining device which determines whether or not the setting change is performed by the setting changing device.

According to this configuration, the setting-change determining device makes it impossible to change the setting of the error correction rate. As a result, the setting of the error correction rate cannot be changed even if a print image lies off the code printing area. Accordingly, it is useful in cases in which the user wishes to adjust the size of the two-dimensional code by himself/herself and print the two-dimensional code just for an designing purpose (without considering the reading thereof).

In these cases, it is preferable that the code printing area be a printable area excluding top-and-bottom margins in the sheet width direction of the print sheet formed into a tape, and the determining device include a print-area identifying unit which acquires a sheet width of the print sheet and identifies the printable area based on the acquired sheet width.

According to this configuration, it is possible to form a print image so as to lie in the printable area of the print sheet formed into a tape. Therefore, the print image is prevented from being printed with the parts thereof (both ends in the sheet width direction) lacked when it is printed.

In these cases, it is preferable that the two-dimensional code be composed of a data area and a margin area which is a margin surrounding the data area, and the determining device determine whether or not the print image of the data area lies off the printable area.

According to this configuration, when only the margin area lies off the printable area, the setting change of the error correction rate is not performed, and the data area is printed over the whole printable area. In this case, even if the margin area lies off the printable area, the area surrounding the printable area may be used as a margin area without causing no problem on the reading. As a result, it is possible to print the data area as large as possible without making the error correction rate smaller than necessary.

According to still another aspect of the invention, there is provided a program which causes a computer to function as each of the devices of the print-image forming apparatus described above.

According to this configuration, it is possible to provide the program such that the print image of the two-dimensional code can lie in the code printable area without making the size of a plurality of cells constituting the two-dimensional code smaller.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
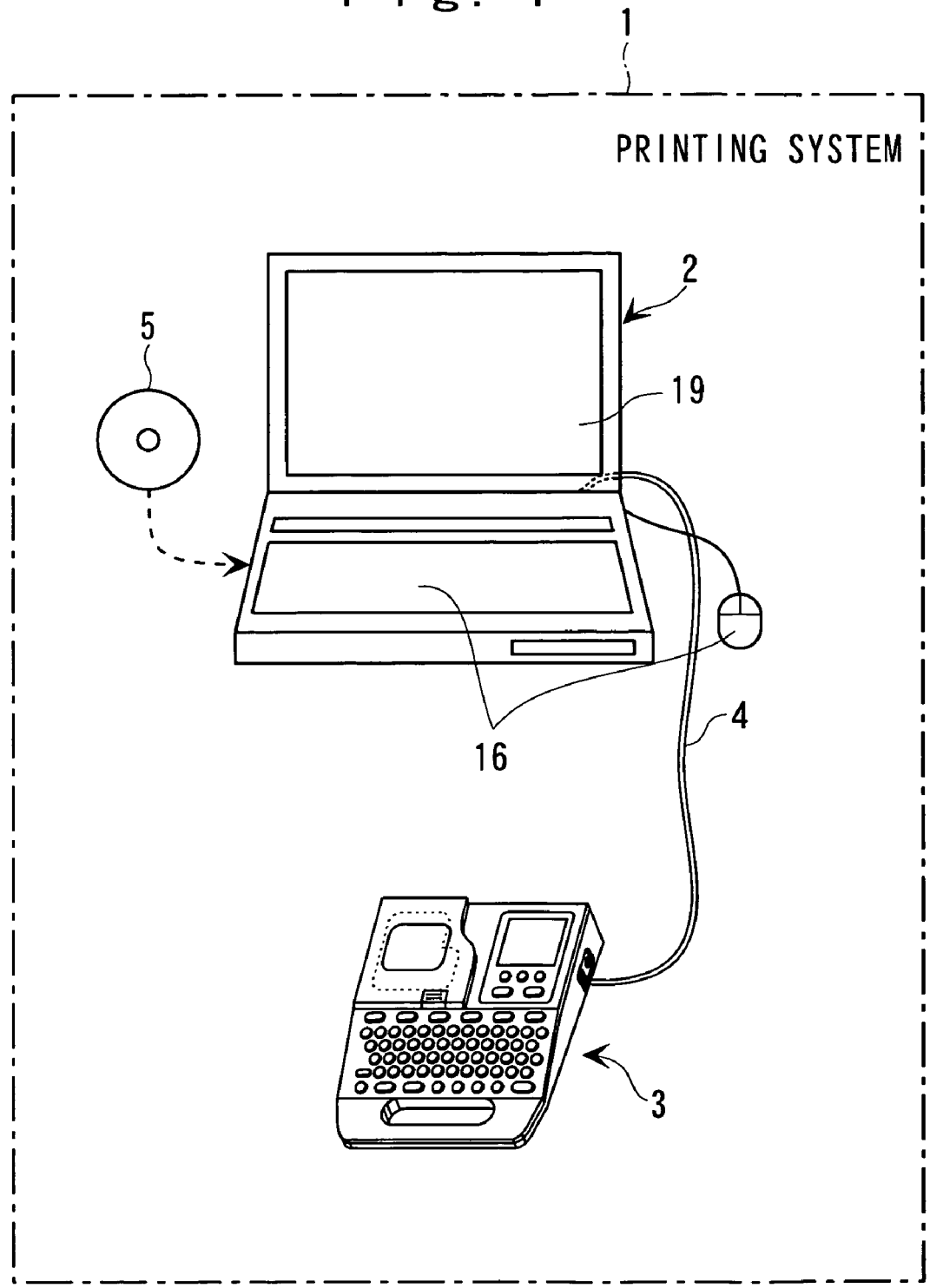
FIG. 1 shows an explanatory drawing of a configuration example of a printing system according to an embodiment of the invention.

Hereinafter, description will be made about a printing system to which the invention is applied, referring to the accompanying drawings. As shown in FIG. 1, the printing system 1 of the present embodiment includes a data generating apparatus 2 (print-image forming apparatus), a printing apparatus 3, and a cable 4 which connects the data generating apparatus 2 and the printing apparatus 3 with USB (Universal Serial Bus). The printing system 1 sends the print data generated by the data generating apparatus 2 to the printing apparatus 3 and causes the printing apparatus 3 to print a print image based on the print data.

Although the data generating apparatus 2 and the printing apparatus 3 are directly connected together through the cable 4 in the present embodiment, they may be connected via networks (the Internet or Local Area Network) using an interface. Furthermore, instead of such a connection as wire communication, it is possible to use wireless communication.

Figure 2:
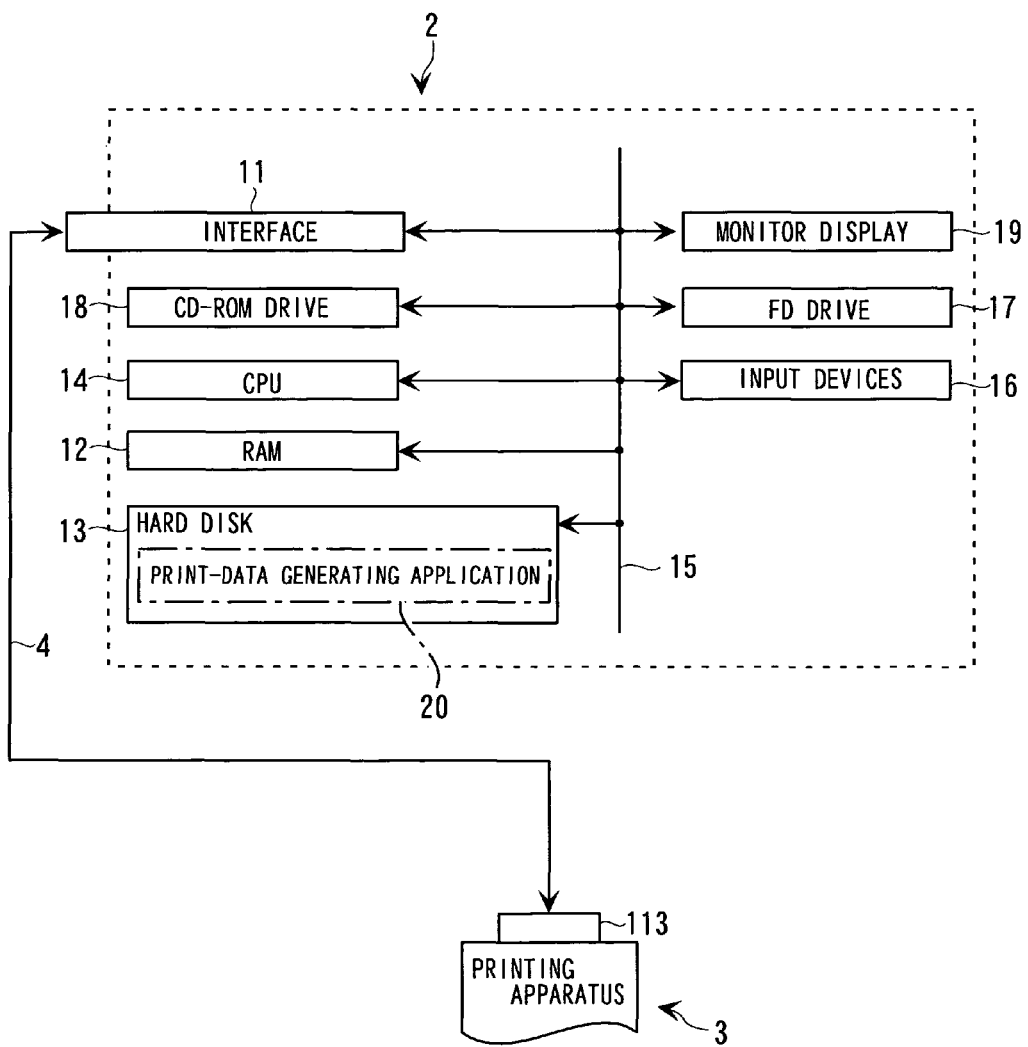
FIG. 2 shows a configuration diagram of a data generating apparatus of the printing system.

As shown in FIG. 2, the data generating apparatus 2 is of a type such as a personal computer or the like and includes a USB interface 11, a RAM 12, a hard disk 13, a CPU 14, and a bus 15. The USB interface 11 is used to connect the data generating apparatus 2 to the printing apparatus 3 through the cable 4. The RAM 12 has a storage area enabling a temporary storage and is used as a work area for control processes. The hard disk 13 has various storage areas and stores generated print data and model information of the printing apparatus 3 in addition to control programs and various data. The CPU 14 calculates various data based on programs or the like stored in the hard disk 13. The bus 15 connects the USB interface 11, the RAM 12, the hard disk 13, and the CPU 14 one another. The data generating apparatus 2 is furthermore equipped with input devices 16 such as a keyboard and a mouse (see FIG. 1), various drives such as a FD drive 17 and a CD-ROM drive 18, and a monitor display 19 to display various data such as inputted print data, messages, or the like (see FIG. 1).

On the hard disk 13 is installed a software (print-data generating application 20) to generate print data. With the data generating apparatus 2, the user is allowed to generate print data by inputting/editing input data on an input and edit screen 21 (see FIG. 3) displayed on a monitor display 19 when the print-data generating application 20 is activated. Note that input data is used as print data when it is not edited.

Figure 3:
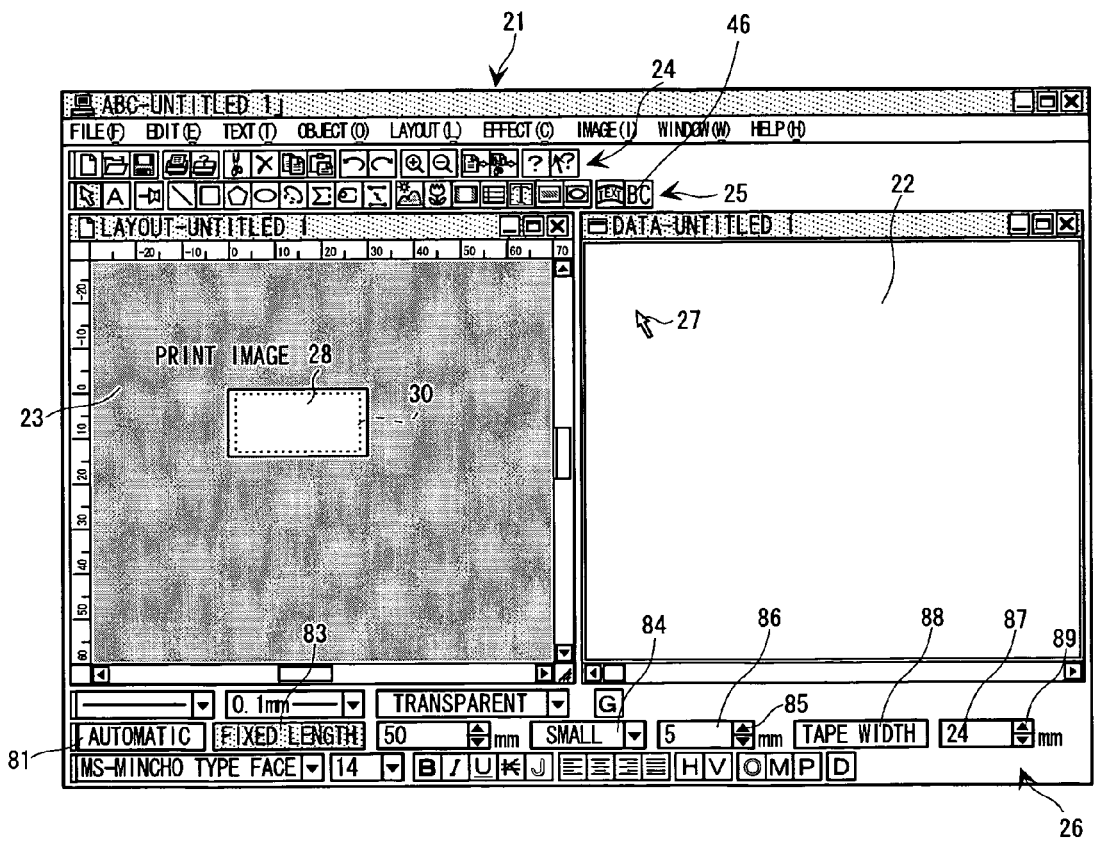
FIG. 3 shows a diagram of an input and edit screen in the data generating apparatus.

As shown in FIG. 3, on the input and edit screen 21 are displayed an input and edit window 22 where input data is inputted and edited with a mouse pointer 27, an image display window 23 where a print image 28 of the print data generated based on the result of an input and edit is displayed, a basic operation tool bar 24 by which a basic operation such as the execution of printing is performed, an input tool bar 25 by which a character string as input data and various figures such as a bar code and an outer frame are inputted, and a label forming tool bar 26 by which forming of a label by the printing apparatus 3 (tape printer 101 as described below) is performed. Accordingly, it is made possible, by a mouse operation, to select and set instructions for inputting input data and edit functions for use, in addition to the inputting and editing of input data with a keyboard. As described in detail below, when a bar-code forming button 46 of the input tool bar 25 is clicked, a bar code forming screen 170 (see FIG. 7) is displayed.

In the label forming tool bar 26 are included an automatic setting button 81 by which a label length to be formed is automatically set according to input data inputted, a fixed-length setting button 83 by which a label length to be formed is set to an arbitrary length, a margin setting list box 84 by which margin lengths (front-and-rear margin areas) placed before and after a print image to be printed are selected and set, a margin setting box 86 in which front-and-rear margin areas are set to an arbitrary length by the use of an up-and-down arrow button 85, and a tape-width acquiring button 88 by which a tape width of a print tape T (see FIG. 5) mounted on the printing apparatus 3 is acquired (as will be described in detail later) and displayed on a tape-width displaying box 87. Note that it is also possible to input a tape width in the tape-width displaying box 87 by a keyboard operation or a mouse operation of the up-and-down arrow button 89.

Next, the printing apparatus 3 will be described. The printing apparatus 3 may be of any type of a thermal printer, an ink jet printer, a laser printer, or the like, and description will now be made about a thermal printer (tape printer) which is to print on a print tape. The tape printer performs printing of a print image on the print tape T based on the print data sent from the data generating apparatus 2 and then cuts off the printed print tape T to form a label (tape piece). Note that the tape printer of the present embodiment is of a type making it possible to form print images such as a character string and a simple figure by itself (although forming and editing of a two-dimensional code described below is not possible) and print the same. Alternatively, a type which is exclusively connected to personal computers and has only a printing function may be used.

Figure 4:
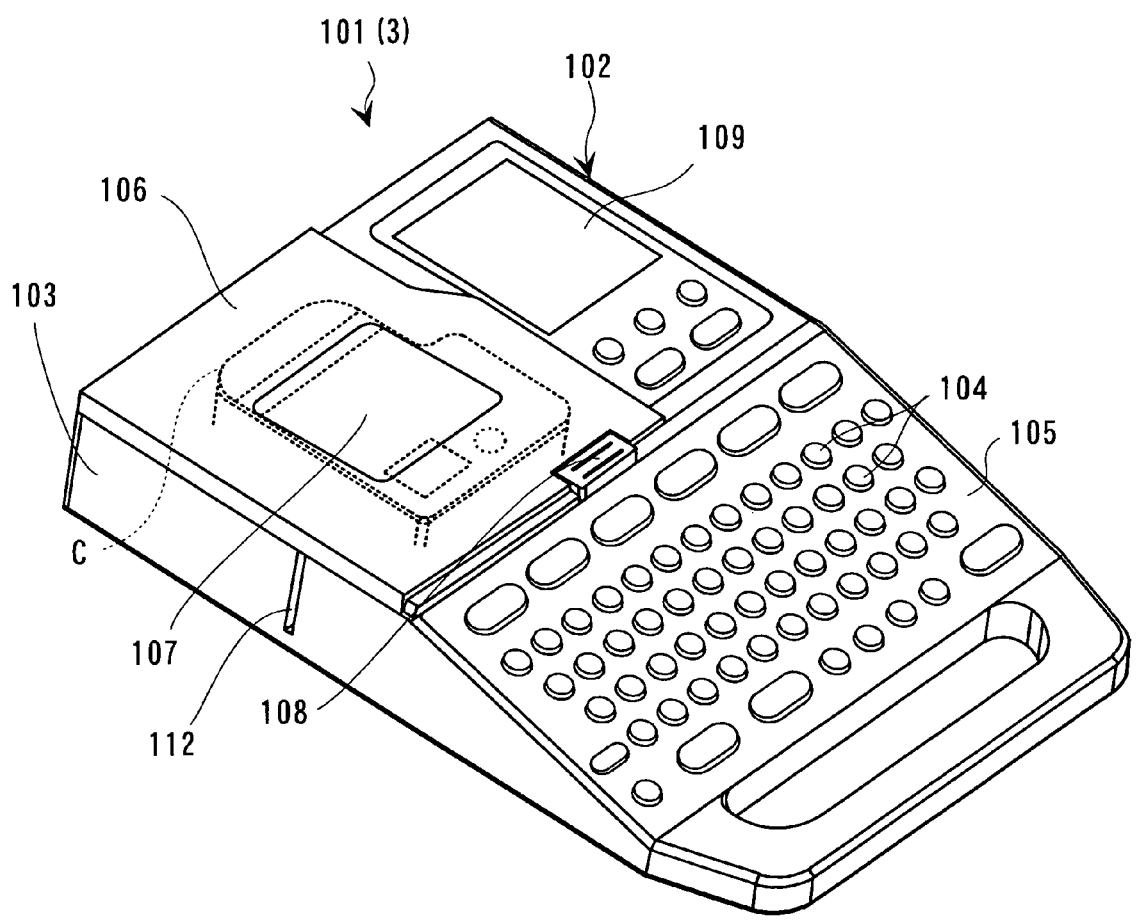
FIG. 4 shows an external perspective view of the tape printer of the printing system with its cover closed.
Figure 5:
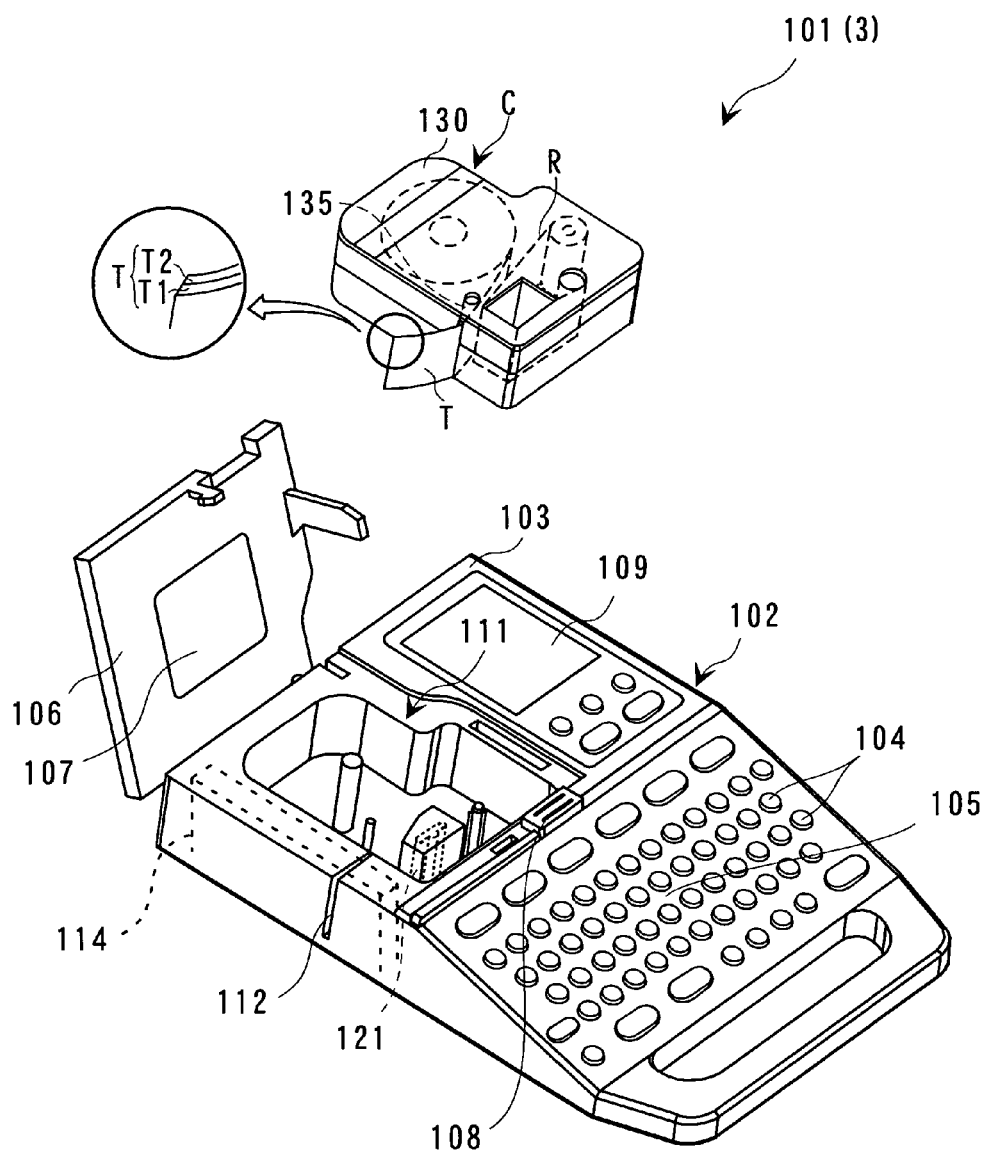
FIG. 5 shows an external perspective view of the tape printer of the printing system with its cover opened.

As shown in FIGS. 4 and 5, the tape printer 101 includes an apparatus main body 102 in which a printing process is performed on the print tape T and a tape cartridge C in which the print tape T (e.g., white in color) and an ink ribbon R (e.g., black in color) are accommodated and which is detachably mounted on the apparatus main body 102.

The apparatus main body 102 has an outer shell formed by an apparatus casing 103 and a keyboard 105 including various keys 104 arranged at the front half part on the top surface of the apparatus casing 103. At the rear half part on the left top surface of the apparatus casing 103 is widely provided an opening and closing cover 106. On the top surface of the opening and closing cover 106 is formed a check window 107 through which mounting/non-mounting states of the tape cartridge C are visually recognized. On the front side of the opening and closing cover 106 is provided a cover-body opening button 108 to open the same. On the right top surface at the rear half part of the apparatus casing 103 is formed a rectangular display 109 which displays input results from the keyboard 105 or the like.

Inside the opening and closing cover 106 is formed a cartridge mounting section 111 with a recess on which the tape cartridge C is mounted. The cartridge mounting section 111 has a tape identification sensor (not shown) composed of a plurality of micro switches disposed at its corner.

The cartridge mounting section 111 is furthermore provided with a thermal head 121 (e.g., 360 dpi) having a heater element. When the tape cartridge C is mounted, the thermal head 121 is brought into contact with a platen roller 135 provided in the tape cartridge C, sandwiching the print tape T and the ink ribbon R therebetween, thereby creating a print standby state. Then, while a tape feeding mechanism (not shown) composed of a motor, a gear train, or the like feeds the print tape T and the ink ribbon R, a printing process (thermal transfer of ink from the ink ribbon R to the print tape T) is performed on the print tape T.

On the left side of the apparatus casing 103 is formed a tape ejecting slot 112 through which the cartridge mounting section 111 is communicated with the outside of the apparatus. Facing the tape ejecting slot 112, a cutter unit 114 which cuts off the print tape T subjected to the printing process to obtain the tape piece is built in the apparatus casing 103.

On the right side of the apparatus casing 103 are formed a power supply port through which electric power is supplied and a connector 113 (see FIG. 2) to which external apparatuses such as a personal computer (not shown) are connected, although omitted in the figures. The connector 113 can be thus connected to the data generating apparatus 2 through the cable 4, thereby making it possible to perform a printing process based on the print data generated by the data generating apparatus 2. Furthermore, although omitted in the figures, inside the apparatus casing 103 is mounted a circuit board constituting a control section (described below) which comprehensively controls the apparatus main body 102.

The print tape T is composed of a record tape T1 having an adhesive agent layer coated on its back surface and a peel tape T2 attached to the record tape T1 with the adhesive agent layer. The user is allowed to peel the peel tape T2 from the tape piece of the print tape T separated after a printing process and attach the same to an object as a label.

The print tape T has a plurality of (e.g., seven) types in tape width ranging from 6 mm to 36 mm. On the back surface of a cartridge casing 130 is formed a plurality of small detection holes (not shown). The above-described tape identification sensor identifies the plurality of detection holes so that the type (tape width) of the print tape T can be identified. In other words, it is made possible to identify the corresponding number of bits constituted of the plurality of detection holes and the plurality of switches.

When the tape-width acquiring button 88 is clicked on the input and edit screen 21 of the data generating apparatus 2, the tape width identified by the tape identification sensor is reported through the cable 4. Note that it may be possible to report information on the type of the print tape T as it is and cause the data generating apparatus 2 to analyze the tape width based on the type thereof. The timing to report is set every time a new tape cartridge C is mounted on the tape printer 101, and the data generating apparatus 2 may keep the information.

In the present embodiment, the tape cartridge C with a tape width of 24 mm is mounted. On the print tape T with a tape width of 24 mm, it is possible to perform printing with a small amount (e.g., approximately 2 mm) of top-and-bottom margin areas (non-printable areas) provided at both ends in the tape-width direction. The margin areas are used to prevent the thermal head 121 from directly contacting the platen roller 13, for example, when the print tape T is moved to the width direction at the time of the tape feeding.

The control section is connected to respective sections of the tape printer 101 and includes, although not shown in the figures, a CPU, ROM, RAM, and IOC (Input Output Controller) all of which are connected to one another through an internal bus. The CPU causes the respective sections of the tape printer 101 to input various signals and data through the IOC in accordance with the control programs in the ROM. The CPU furthermore processes various data in the RAM based on the inputted various signals and data and outputs the various signals and data to the respective sections of the tape printer 101 through the IOC, thereby performing controlling of a printing process or the like. Note that the RAM includes a print buffer as an area in which a print image to be printed on the print tape T is formed based on the print data sent from the data generating apparatus 2.

Description will now be made about a case in which a print image of a two-dimensional code is printed on the print tape T according to the printing system 1 of the present embodiment. In the present embodiment, since a QR code is printed as a two-dimensional code, description will first be made about the QR code.

Figure 6:
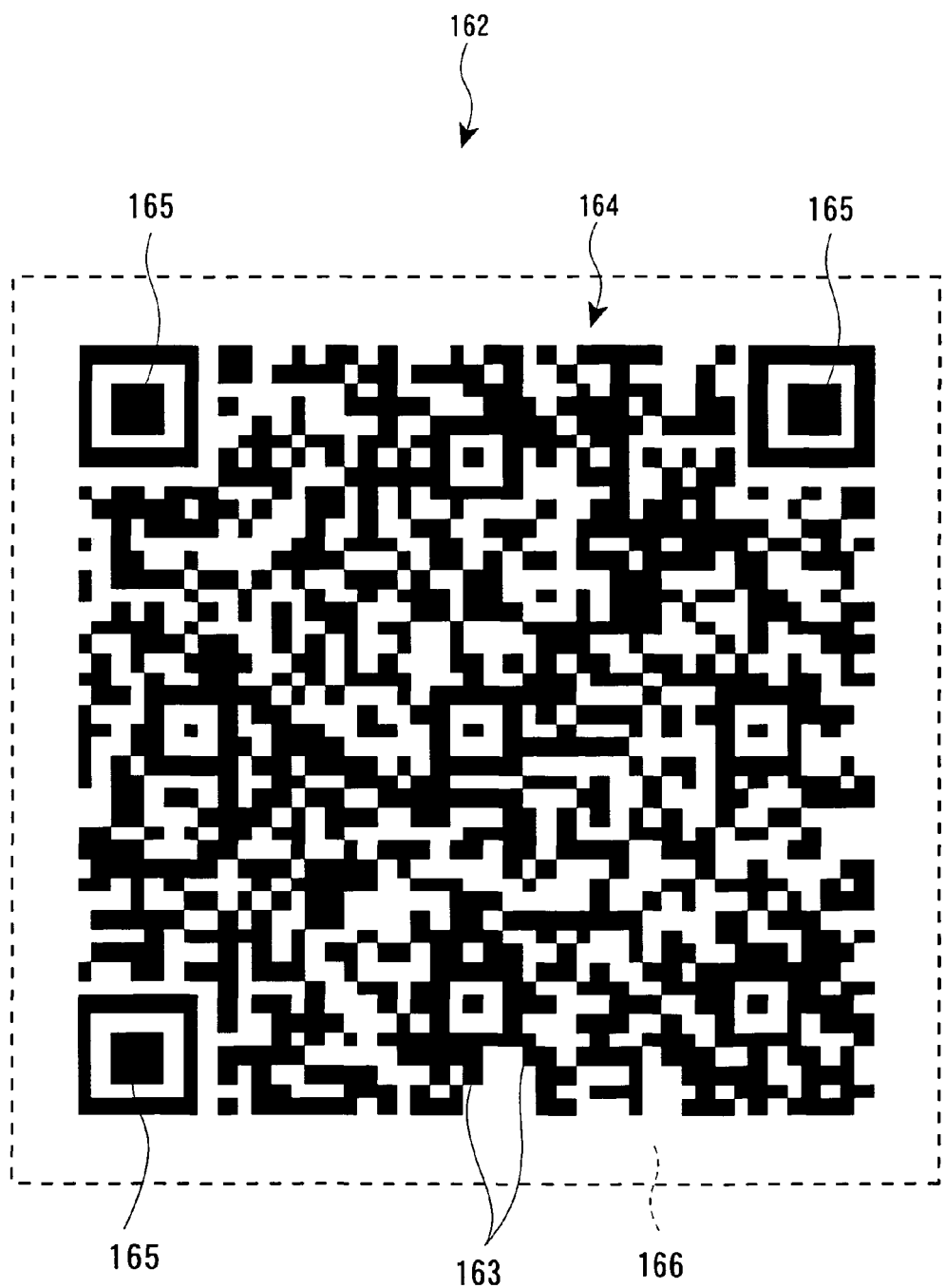
FIG. 6 shows an explanatory drawing of a QR code as one of the two-dimensional codes.

As shown in FIG. 6, the QR code 162 is composed of a square data area 164 made up of a plurality of cells 163 arranged in a matrix form, three segment symbols 165 (one in the below-described micro QR code) placed at corners of the data area 164, and a margin area 166 (quiet zone) which is a margin surrounding the data area 164.

The data area 164 is composed of the plurality of cells 163 in a black and white pattern and stores input information such as a character string and an error correction code (Reed-Solomon code) formed by coding the below-described error correction function. Furthermore, the segment symbols 165 are position-detecting patterns, by which to detect the position of and to read the data area 164 from all directions. The margin area 166 is used to perform an accurate reading of the QR code 162 and provided for four cells for example vertically and horizontally in the data area 164.

The QR code 162 has an error correction function to restore data by itself even if the data area is somewhat stained or damaged. The error correction rates provided are four including 7%, 15%, 25%, and 30%. At the error correction rate of "15%," for example, it is made possible to restore data even if approximately 15% of the data area 164 is damaged.

The size of the QR code 162 is determined by the number (version) of the cells 163 as the minimum constitutional unit of the data area 164 and the size (length of one side) of each of the cells 163. Moreover, a version is based on the amount of information (number of characters) to be stored and the error correction rate. With the error correction rate upgraded, the storable amount of data increases, which in turn increases the number of the cells involved (upgrading the version), with the result that the QR code 162 expands further.

Note that the QR code 162 is mainly of three types including a type 1 as the basic type, a type 2 having a configuration in which an alignment pattern is added to the configuration of the type 1, and a micro QR code applied for space saving of the substrate or the like. All the three types of the QR code 162 have the above-described configuration, but the micro QR code has only one segment symbol 165 to improve the data storage efficiency.

Next, description will be made about the editing process of the QR code 162. First, when the print-data generating application 20 of the data generating apparatus 2 is activated to prepare the editing process, the input and edit screen 21 is displayed on the monitor display 19. Then, when the tape-width acquiring button 88 is clicked, the tape width (24 mm) of the print tape T in the tape cartridge C mounted on the tape printer 101 is reported, and the tape width is displayed on the tape-width displaying box 87. A fixed-length printing is performed here. The fixed-length setting button 83 is clicked to set a desired fixed-length (e.g., 50 mm) and the front-and-rear margin areas (margins on both sides in the tape-length direction) are set to a desired length (e.g., 5 mm for each margin area) with the margin setting box 86 (see FIG. 3).

Based on the tape width thus reported and the fixed-length thus set, a printable area 30 (see FIG. 3) which is a printable area is set in the print tape T. Specifically, the printable area 30 is formed to have a length of "20 mm" in the tape-width direction, which is obtained by subtracting the lengths of the top-and-bottom margin areas (2 mm for each margin area) from the tape width (24 mm) and to have a length of "40 mm" in the tape-length direction, which is obtained by subtracting those of the front-and-rear margin areas (5 mm for each margin area) set in the margin setting box 86 from the fixed length (50 mm). When the bar-code forming button 46 provided at the input tool bar 25 is clicked, the bar-code forming screen 170 is displayed.

Figure 7:
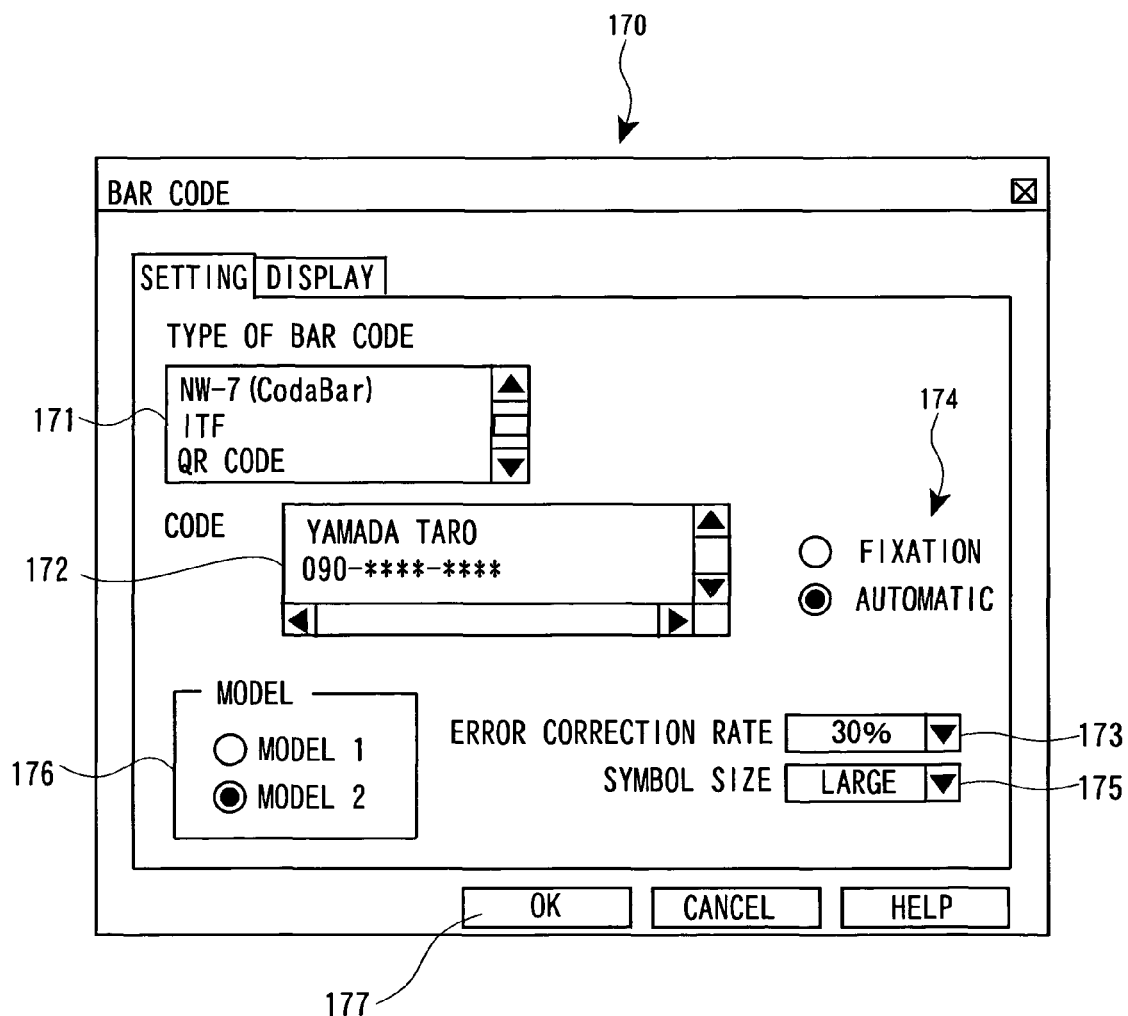
FIG. 7 shows a diagram of a bar-code forming screen of the input and edit screen in the data generating apparatus.

As shown in FIG. 7, the bar-code forming screen 170 includes a type selection box 171 by which to select the type of bar code, a data input window 172 by which to input data (name, telephone number, or the like) to be coded, a correction rate setting box 173 by which to set an error correction rate, setting change radio buttons 174 by which to select (determine) whether or not to perform an automatic setting change of an error correction rate, a cell-size setting box 175 by which to set the size (symbol size) of each of the cells 163, and a model radio box 176 by which to select a model of the QR code 162.

The correction rate setting box 173 is of a pull-down menu, in which the four levels of error correction rates (7%, 15%, 25%, and 30%) described above are provided to allow the user to select any one of them. Likewise, the cell-size setting box 175 is of a pull-down menu, which allows the user to select an error correction rate from between two levels of, for example, "LARGE/SMALL." In the case of "LARGE" in cell size, one side of the cell is, for example, 0.42 mm in length (corresponding to 6 dots in the present embodiment). In the case of "SMALL" in cell size, one side of the cell is, for example, 0.28 mm in length (corresponding to 4 dots in the present embodiment). Note that, although MODEL 1 and MODEL 2 are selected in the model radio box 176, it may be arranged such that a micro QR code is also selected.

Figure 8:
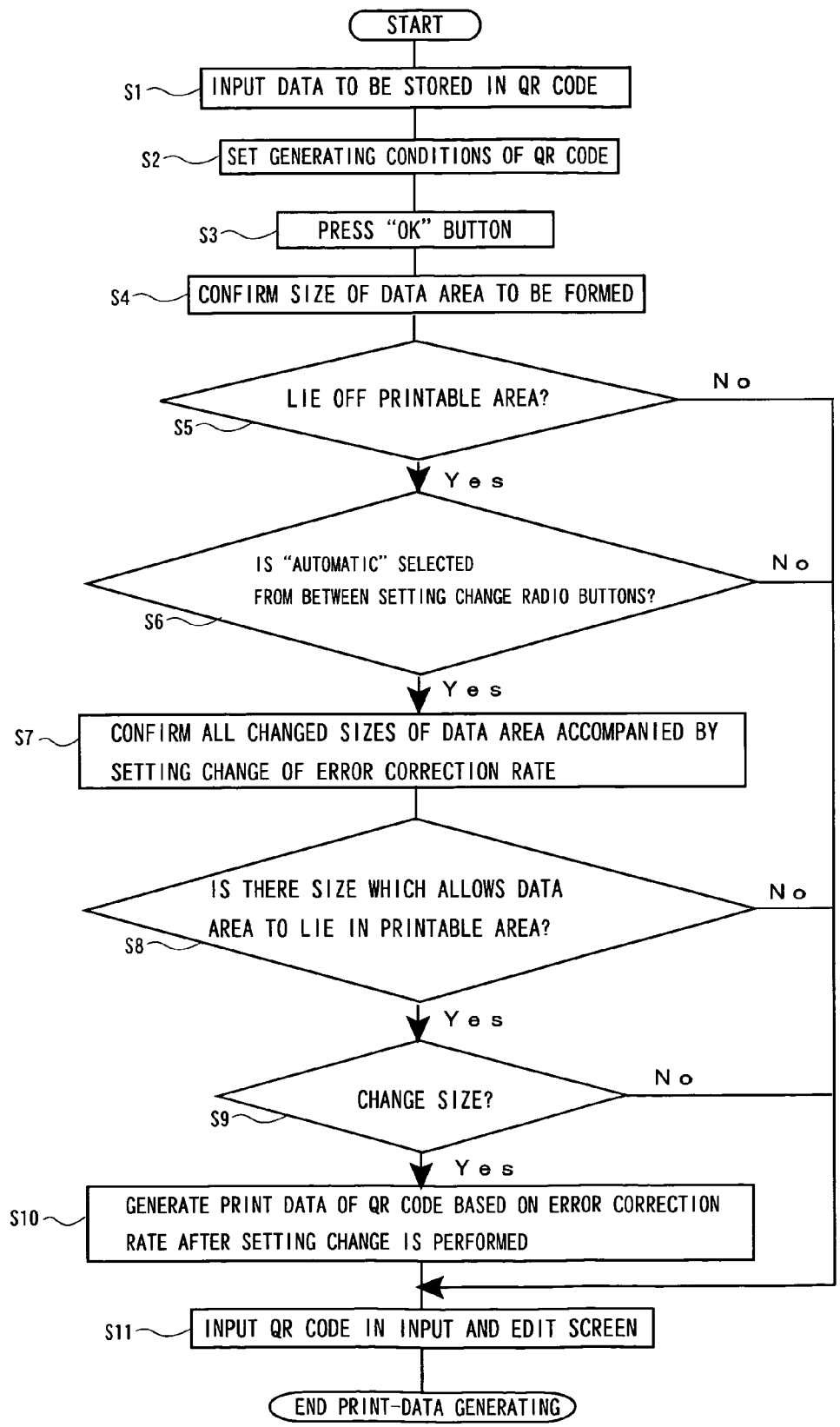
FIG. 8 shows an flow chart of the editing process of the QR code in the data generating apparatus.
Figure 9:
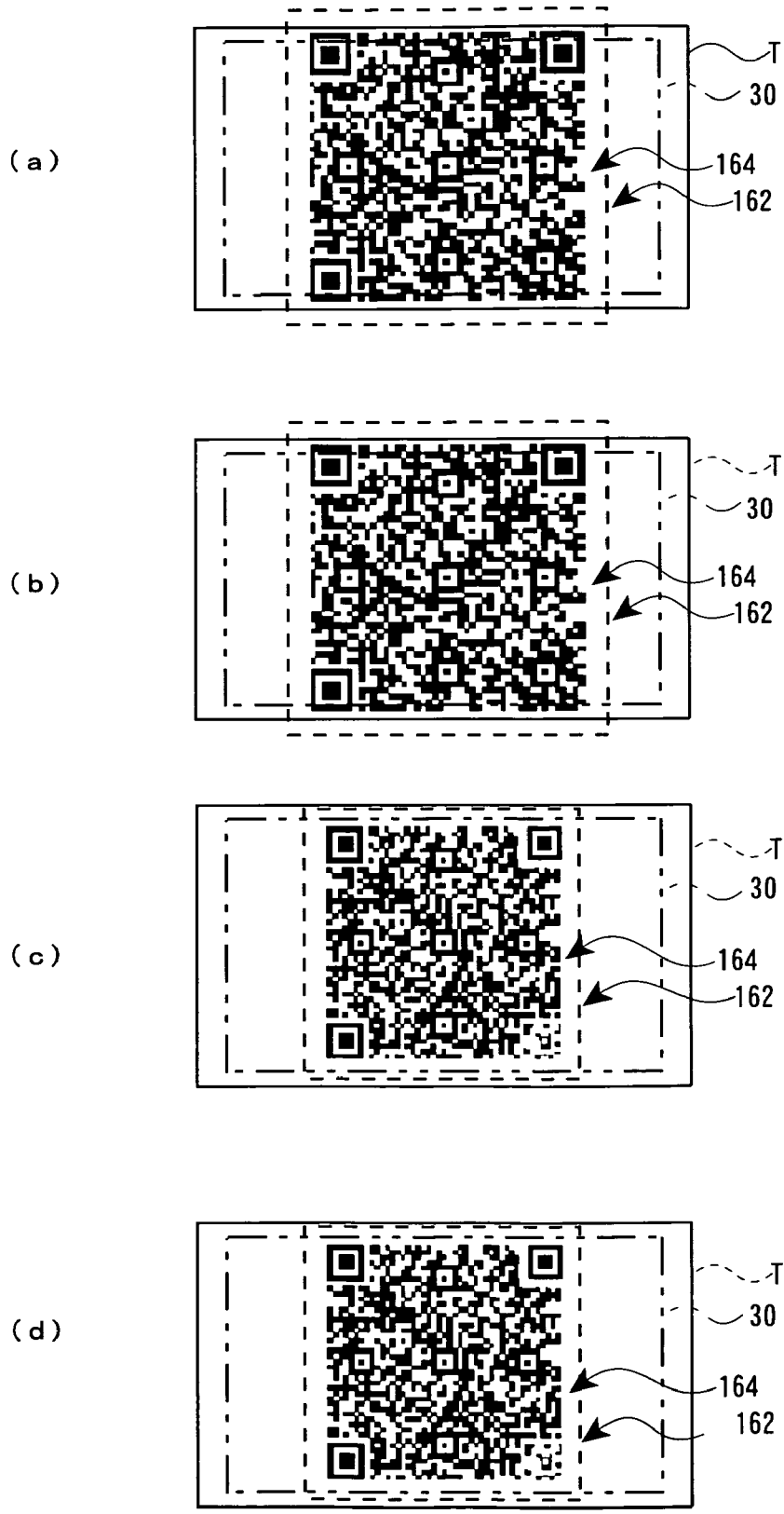
FIGS. 9A to 9D show diagrams describing the confirmation processes of the size of the data area when the setting change of the error correction rate is performed.

Referring to FIG. 8, description will now be made in detail about the editing process of the QR code 162. The user first selects the "QR CODE" in the type selection box 171 to form the QR code 162 and then inputs in the data input window 172, for example, the name "YAMADA TARO" and the telephone number "090-xxx-0000" as data to be stored in the QR code 162 (S1 of FIG. 8).

Next, forming conditions for the QR code 162 are set (S2). Specifically, an error correction rate is set to "30%" in the correction rate setting box 173; a cell size is set to "LARGE" in the cell-size setting box 175; and a model of the QR code 162 is set to "MODEL 2" in the model radio box 176. Furthermore, "AUTOMATIC" is selected here from between the setting change radio buttons 174 so that the setting change of the below-described error correction rate is automatically performed.

After setting the forming conditions, the user clicks the OK button 177 of the bar code forming screen 170 (S3). The print data of the QR code 162 is thereby generated in the data generating apparatus 2. Then, the size of the data area 164 is confirmed based on the print data thus generated (S4). Here, one side of the data area 164 is, for example, 22 mm in length.

It is then determined whether or not the data area 164 lies off the printable area 30 (S5). Since the printable area 30 has a size of 20 mm×40 mm as described above, it is determined that the top and bottom areas of the data area 164 lie off the printable area 30 (S5; Yes).

Subsequently, it is determined whether or not "AUTOMATIC" is selected from between the setting change radio buttons, and "AUTOMATIC" is determined to be selected here (S6; Yes). Note that, if the user selects "FIXATION" from between the setting change radio buttons 174 in advance, it is determined that "AUTOMATIC" is not selected (S6; No), resulting in that the setting change process for the following error correction rate will not be performed and the QR code 162, in which the top and bottom areas of the data area 164 lie off the printable area 30, is inputted in the input and edit screen (S11). Accordingly, selecting FIXATION is useful in cases in which the user wishes to adjust the size of the QR code 162 by himself/herself and print the QR code 162 just for an designing purpose (without considering the reading thereof).

Then, at the time when an error correction rate is changed to another error correction rate, the size of the data area 164 is confirmed (S7). FIGS. 9A to 9D show diagrams conceptually describing the confirmation processes of the size of the data area 164 when the setting change of the error correction rate is performed. When the error correction rate is changed from 30% (see FIG. 9A) to 25%, one side of the data area 164 remains 22 mm (see FIG. 9B). When the error correction rate is changed to 15%, it becomes 18 mm (see FIG. 9C). When the error correction rate is changed to 7%, it also becomes 18 mm (see FIG. 9D). Note that the print image of the data area 164 after the setting change may be displayed on the input and edit screen 21.

It is then determined whether or not there is any of the data areas 164, changed to the respective error correction rates, which can lie in the printable area 30. When the error correction rate is changed to either 15% or 7%, the data area 164 can lie in the printable area 30. Therefore, it is determined that there is a data area 164 lying in the printable area 30 (S8; Yes).

Then, a confirmation message, e.g., "CHANGE SETTING OF ERROR CORRECTION RATE?" is displayed on the input and edit screen 21. When the user selects (clicks) "Yes" (S9; Yes), the setting change of the error correction rate is performed. Here, the error correction rate is changed to the maximum one, i.e., "15%," from among the error correction rates at which the data area 164 can lie in the printable area 30 to provide the QR code 162 to be printed with as high an error correction function as possible.

Finally, the print data of the QR code 162 is generated based on the error correction rate after the setting change is performed (S10). The print image of the print data is inputted on the input and edit screen 21 to complete the editing process of the QR code 162 (S11).

As described above, according to the data generating apparatus 2 of the present embodiment, the setting of "AUTOMATIC" from between the setting change radio buttons 174 makes it possible to automatically set a low error correction rate at which to cause the data area 164 lie in the printable area 30 and generate print data based on the error correction rate after the setting change is performed. As a result, the data area 164 can lie in the printable area 30. For this reason, the low error correction rate allows the print image of the QR code 162 to be reduced in size so as to lie in the printable area 30 without making the cell size of the QR code 162 smaller. Accordingly, it is possible to form good images of the QR code 162 without deterioration in quality of a print image and reading accuracy. Moreover, the setting change of the error correction rate is automatically performed without causing any inconvenience to the user.

As described above, it is determined whether or not the print data (print image) of the data area 164 lies off the printable area 30 in the present embodiment. It may also be determined whether or not the print image of the QR code 162 including the margin areas 166 lies off the printable area. It may further be determined whether or not the print image lies off any code printing area (e.g., in the outer frame) where the QR code 162 is printed. When it is determined that any such print image lies off the code printing area, a setting change of the error correction rate may be performed to make the print image lie in the code printing area.

It is needless to say, according to the present embodiment, that the setting change of the error correction rate is not performed when only the margin areas 166 lie off the printable area 30, and the data area is printed over the whole printable area 30. In this case, even if the margin areas 166 lie off the printable area 30, the area surrounding the printable area 30 may be used as a margin area without causing no problem on the reading. In other words, as described above, the top and bottom margins and the left and right margins in the printable area 30 are set to 2 mm and 5 mm, respectively, and one side of a cell is 0.42 mm in length even when a cell size is set to "LARGE" in the present embodiment. Therefore, margins of four or more cells are each provided vertically and horizontally in the printable area 30. As a result, it is possible to print the data area 164 as large as possible without making the error correction rate smaller than necessary.

A two-dimensional code may be of any type such as a Maxi code, a Veri code, a Data matrix, and PDF 417 in addition to the QR code 162 as long as their sizes are defined based on an error correction rate.

Moreover, it is also possible to provide the print-data generating application 20 of the data generating apparatus 2 as a software. Furthermore, it is possible to store the software in a recording medium 5 (see FIG. 1) when providing the same. A CD-ROM, flash ROM, memory card, magnetic optical disk, or the like can be used as a storage medium.

Furthermore, although the present embodiment has the printing system 1 as its configuration, it may be possible that the tape printer 101 is provided with the function of the print-data generating application 20 to be used as a stand-alone type printer, thereby forming and editing a print image of the QR code 162.

What is claimed is:

1. A print-image forming apparatus which forms a print image for printing on a print sheet a two-dimensional code whose size is defined based on an error correction rate, the apparatus comprising:

a storage device which stores a plurality of levels of error correction rates;

a setting device which sets an arbitrary error correction rate from among the plurality of error correction rates;

an image forming device which forms the print image based on the error correction rate thus set;

a determining device which determines whether or not the formed print image lies off a code printing area in a fixed size of the print sheet where the two-dimensional code is printed, the code printing area defined by subtracting a margin area from the print sheet; and a setting changing device which changes the setting of the error correction rate such that the print image can lie in the code printing area when it is determined that the print image lies off the code printing area.

2. The print-image forming apparatus according to claim 1, wherein the setting changing device changes the error correction rate for the maximum one from among the error correction rates at which the print image can lie in the code printing area.

3. The print-image forming apparatus according to claim 1, further comprising a setting-change determining device which determines whether or not the setting change is performed by the setting changing device.

4. The print-image forming apparatus according to claim 1, wherein the code printing area is a printable area excluding top-and-bottom margins in the sheet width direction of the print sheet formed into a tape, and the determining device includes a print-area identifying unit which acquires a sheet width of the print sheet and identifies the printable area based on the acquired sheet width.

5. The print-image forming apparatus according to claim 1, wherein the two-dimensional code is composed of a data area and a margin area which is a margin surrounding the data area, and the determining device determines whether or not the print image of the data area lies off the printable area.

6. A program recorded on a non-transitory, tangible computer readable medium instructing a computer to function as each of the devices of the print image forming apparatus according to claim 1.

7. The print-image forming apparatus according to claim 1, wherein a tape width of the print sheet is automatically detected.

8. The print-image forming apparatus according to claim 1, wherein a tape width of the print sheet is reported from an outside apparatus connected thereto.

9. A print-image forming method for forming a print image for printing on a print sheet a two-dimensional code whose size is defined based on an error correction rate, the method comprising:

setting, by a setting device, an arbitrary error correction rate from among a plurality of levels of error correction rates stored in advance in a storage device;

forming, by an image forming device, the print image based on the error correction rate thus set;

determining, by a determining device, whether or not the formed print image lies off a code printing area in a fixed size of the print sheet where the print image is printed, the code printing area defined by subtracting a margin area from the print sheet; and changing, by a changing device, the setting of the error correction rate such that the print image can lie in the code printing area when it is determined that the print image lies off the code printing area.

10. The print-image forming method according to claim 9, and further comprising automatically detecting a tape width of the print sheet.

11. The print-image forming method according to claim 9, and further comprising reporting a tape width of the print sheet from an outside apparatus connected thereto.

* * * * *